United States Patent
Chiu et al.

(10) Patent No.: US 10,707,756 B2
(45) Date of Patent: Jul. 7, 2020

(54) METHOD FOR IMPROVING EFFICIENCY OF POWER CONVERTER

(71) Applicant: MEDIATEK Inc., Hsin-Chu (TW)

(72) Inventors: Chao-Chang Chiu, Hsinchu (TW); Kuo-Chun Hsu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/395,354

(22) Filed: Apr. 26, 2019

(65) Prior Publication Data
US 2020/0076300 A1    Mar. 5, 2020

Related U.S. Application Data

(60) Provisional application No. 62/723,523, filed on Aug. 28, 2018.

(51) Int. Cl.
| | | |
|---|---|---|
| *H02M 3/157* | (2006.01) | |
| *H02M 1/08* | (2006.01) | |
| *H02M 3/158* | (2006.01) | |
| *H02M 1/00* | (2006.01) | |

(52) U.S. Cl.
CPC .......... *H02M 3/157* (2013.01); *H02M 1/08* (2013.01); *H02M 3/158* (2013.01); *H02M 2001/0009* (2013.01); *H02M 2001/0032* (2013.01)

(58) Field of Classification Search
CPC .......... H02M 1/15; H02M 2001/0032; H02M 2001/0035; H02M 3/156; H02M 2003/1566; H02M 3/157; H02M 3/1582
USPC ........................................................ 323/282
See application file for complete search history.

(56) References Cited

U.S. PATENT DOCUMENTS

| | | | |
|---|---|---|---|
| 8,981,752 B2 | 3/2015 | Huang et al. | |
| 9,013,163 B2* | 4/2015 | Faerber | H02M 3/156 |
| | | | 323/284 |
| 9,431,907 B2* | 8/2016 | Michishita | H02M 3/1588 |
| 9,722,587 B2 | 8/2017 | Tsutsumi | |
| 10,033,279 B2 | 7/2018 | Chen et al. | |
| 10,348,208 B2 | 7/2019 | Tsou et al. | |
| 2010/0102642 A1* | 4/2010 | Odaohhara | H02M 3/158 |
| | | | 307/125 |
| 2010/0253308 A1 | 10/2010 | Chiang | |

(Continued)

FOREIGN PATENT DOCUMENTS

| | | |
|---|---|---|
| CN | 101656473 A | 2/2010 |
| CN | 104617774 A | 5/2015 |

(Continued)

OTHER PUBLICATIONS

EP Search Report dated Nov. 4, 2019 in EP Application (No. 19173761.8-1201).

(Continued)

*Primary Examiner* — Alex Torres-Rivera
(74) *Attorney, Agent, or Firm* — McClure, Qualey & Rodack, LLP

(57) ABSTRACT

The invention provides a method for improving efficiency of a power converter which may include a switch coupled between a power source and a middle node, and may supply an inductor current at the middle node to result in an output voltage and a load current. The method may comprise: during an intermediate mode, controlling the inductor current to ripple with peaks at a peak current threshold and valleys which may vary as the load current varies.

19 Claims, 6 Drawing Sheets

(56) References Cited

U.S. PATENT DOCUMENTS

| | | | |
|---|---|---|---|
| 2010/0320986 A1* | 12/2010 | Collins | H02M 3/156 323/284 |
| 2012/0014148 A1* | 1/2012 | Li | H02M 1/44 363/78 |
| 2013/0033902 A1* | 2/2013 | Zhang | H02M 7/2176 363/15 |
| 2013/0162237 A1* | 6/2013 | Huang | H02M 3/158 323/311 |
| 2014/0062433 A1* | 3/2014 | Zhou | H02M 3/158 323/271 |
| 2015/0326123 A1 | 11/2015 | Fukushima et al. | |
| 2016/0172974 A1* | 6/2016 | Teh | H02M 3/158 323/271 |
| 2016/0226375 A1* | 8/2016 | Phadke | H02M 3/04 |
| 2018/0131274 A1* | 5/2018 | Chen | H02M 3/156 |
| 2018/0234007 A1* | 8/2018 | Xu | H02M 3/33523 |

FOREIGN PATENT DOCUMENTS

| | | |
|---|---|---|
| TW | 201328141 A | 7/2013 |
| TW | 201521343 A | 6/2015 |

OTHER PUBLICATIONS

TW Office Action dated Jan. 1, 2020 in Taiwan Application (No. 108129712).

* cited by examiner

METHOD FOR IMPROVING EFFICIENCY OF POWER CONVERTER

This application claims the benefit of U.S. provisional application Ser. No. 62/723,523, filed Aug. 28, 2018, the subject matter of which is incorporated herein by reference.

FIELD OF THE INVENTION

The present invention relates to method for improving efficiency of power converter, and more particularly, to method improving efficiency by controlling an inductor current to ripple with constant peaks and varied valleys during an intermediate mode between a light-load mode and a heavy-load mode.

BACKGROUND OF THE INVENTION

Power converter, such as DC-DC buck (e.g., step-down) converter, can convert unregulated power of a DC (direct-current) power source to regulated output voltage and load current for a load, and is therefore essential for modern electronics, such as smart phone, mobile phone, tablet/notebook/portable computer, digital camera, digital camcorder, handheld game console, or wearable gadget (glasses, wrest ring, watch, armlet, earphone, headset), etc.

Please refer to FIGS. 1a, 1b and 1c; FIG. 1a illustrates a conventional power converter 100, FIG. 1b illustrates operation of the power converter 100, and FIG. 1c illustrates power conversion efficiency of the power converter 100. As shown in FIG. 1a, the power converter 100 includes two transistors as two switches sp1 and sp2, to cooperate with an inductor L0 and a capacitor C0 for supplying power to a load 110 at a node p1. The switch sp1 is coupled between a power source Vin and a node p0, the switch sp2 is coupled between the node p0 and a ground voltage G. The inductor L0 is coupled between the nodes p0 and p1, and the capacitor C0 is coupled between the node p1 and the ground voltage G. When the switch sp1 turns on to conduct the power source Vin to the node p0, an inductor current iL0 of the inductor L0 increases; when the switch sp1 turns off to stop conducting the power source Vin to the node p0, the inductor current iL0 decreases. As the switch sp1 cycles between on and off, the inductor current iL0 ripples. Via the inductor L0 and the capacitor C0, the inductor current iL0 results in an output voltage Vout and a load current iLoad at the node p1 to supply power to the load 110.

The conventional power converter 100 utilizes PFM and PWM modes for different load demands. As shown in FIG. 1b, before a time point tp1, the load 110 drains less power and the load current iLoad is low, the power converter 100 operates in the PFM mode for controlling the switch sp1 to cycle between on and off less frequently, and a switch frequency of the switch sp1, which may be a reciprocal of a period during which the switch sp1 is turned on and off once, is low. On the other hand, at the time point tp1, the load 110 demands more power and the load current iLoad rises, so the power converter 100 exits the PFM mode and enters the PWM mode for controlling the switch sp1 to cycle between on and off more frequently, and the switch frequency of the switch sp1 steps up to a higher frequency fmax.

Disadvantages of the conventional power converter 100 may be explained by referring to FIG. 1c. When the demanded load (load current) ascends from low to high, power conversion efficiency of the power converter 100 is shown by a cross-marked curve ec1 in FIG. 1c; on the other hand, when demanded load descends from high to low, the power conversion efficiency of the power converter 100 is shown by a circle-marked curve ec2. It is first noted that the two curves ec1 and ec2 diverge and fail to meet each other; the curve ec2 is lower than the curve ec1 between load values a1 and a4. In other words, the efficiency achieved when the demanded load falls from the values a4, a3, a2 to a1 (along the curve ec2) is worse than the efficiency achieved when the demanded load rises from the values a1, a2, a3 to a4 (along the curve ec1). Furthermore, it is noted that the curve ec1 drops along a sudden downward ramp at the load vale a3, rather than a slowly varying curve.

SUMMARY OF THE INVENTION

To overcome disadvantages of the conventional power conversion, an objective of the invention is providing a method (e.g., 300 in FIG. 3) for improving efficiency of a power converter (e.g., 200 in FIG. 2) which may include a switch (e.g., sw1) coupled between a power source (e.g., Vin) and a middle node (e.g., n0), along with a control logic (e.g., 220) coupled to the switch. The power converter may supply an inductor current (e.g., iL1) at the middle node to result in an output voltage (e.g., Vo) and a load current (e.g., iLoad). The method may include: during an intermediate mode (e.g., 320 in FIGS. 3 and 4), controlling the inductor current to ripple with peaks at a peak current threshold (e.g., I_peak in FIG. 4) and valleys which may vary as the load current varies. In an embodiment, the method may further include: during a light-load mode (e.g., 310 in FIGS. 3 and 4), controlling the inductor current to ripple with peaks at the peak current threshold and valleys at a bottom current threshold (e.g., I_z in FIG. 4) by the control logic. In an embodiment, the peak current threshold may be a constant value. In an embodiment, the bottom current threshold may be a constant value less than the peak current threshold, e.g., the bottom current threshold may be a constant value close to zero or equal to zero.

In an embodiment, the method may further include: during a heavy-load mode (e.g., 330 in FIGS. 3 and 4), controlling the inductor current to ripple in a narrower range comparing to a range in which the inductor current ripples during the light-load mode.

In an embodiment, the method may further include: after exiting the light-load mode, entering the intermediate mode before entering the heavy-load mode; and, after exiting the heavy-load mode, entering the intermediate mode before entering the light-load mode.

In an embodiment, controlling the inductor current to ripple in the narrower range during the heavy-load mode may include following operations: by the control logic, determining when to turn on the switch according to an amount of an error between a reference voltage (e.g., Vref in FIG. 2) and the output voltage; and, turning off the switch when a predetermined interval has elapsed after turning on the switch.

In an embodiment, the method may further include (e.g., 318 in FIG. 3): determining whether to enter the intermediate mode from the heavy-load mode according to whether the peak(s) of the inductor current is/are lower than a mode-switching current threshold. In an embodiment, the mode-switching current threshold may equal the peak current threshold.

In an embodiment, the method may further include (e.g., 314 in FIG. 3): determining whether to enter the heavy-load mode from the intermediate mode according to whether an on-time for the switch to remain on is shorter than a predetermined on-time threshold, such that a switch frequency for the switch to cycle between on and off during the heavy-load mode may be higher than the switch frequency during the intermediate mode.

In an embodiment, controlling the inductor current to ripple with peaks at the peak current threshold and valleys at the bottom current threshold during the light-load mode may include following operations: turning on the switch when the output voltage is lower than the reference voltage; and, turning off the switch when the inductor current reaches the peak current threshold.

In an embodiment, controlling the inductor current to ripple with peaks at the peak current threshold and valleys which may vary as the load current varies during the intermediate mode may include following operations: turning off the switch when the inductor current reaches the peak current threshold; and, after turning off the switch, determining when to stop turning off the switch (e.g., determining when to turn on the switch again) according to the amount of the error between the reference voltage and the output voltage.

In an embodiment, the method may further include (e.g., 308 in FIG. 3): determining whether to enter the light-load mode from the intermediate mode according to whether the inductor current reaches the bottom current threshold.

In an embodiment, the method may further include (e.g., 304 in FIG. 3): determining whether to enter the intermediate mode from the light-load mode according to whether an off-time for the switch to remain off is shorter than an off-time threshold.

An objective of the invention is providing a method (e.g., 300 in FIG. 3) for improving efficiency of a power converter (e.g., 200 in FIG. 2). The power converter may supply an inductor current (e.g., iL1) at a middle node (e.g., n0) to result in an output voltage (e.g., Vo) and a load current (e.g., iLoad), and the power converter may include a switch (e.g., sw1) coupled between a power source (e.g., Vi) and the middle node, along with a control logic (e.g., 220) coupled to the switch. The method may include: during an intermediate mode (e.g., 320 in FIGS. 3 and 4), turning on the switch to conduct the power source to the middle node, and turning off the switch to stop conducting the power source to the middle node when the inductor current reaches a peak current threshold (e.g., I_peak in FIG. 4); and, during the intermediate mode, after turning off the switch, determining when to stop turning off the switch (e.g., determining when to turn on the switch again) according to an amount of error between a reference voltage (e.g., Vref in FIG. 2) and the output voltage.

In an embodiment, the method may further include (e.g., 314 in FIG. 3): determining whether to enter a heavy-load mode (e.g., 330 in FIGS. 3 and 4) from the intermediate mode according to whether an on-time for the switch to remain on is shorter than a predetermined on-time threshold.

In an embodiment, the method may further include (e.g., 318): determining whether to enter the intermediate mode from the heavy-load mode according to whether a peak of the inductor current is lower than a mode-switching current threshold which may equal the peak current threshold in an embodiment.

In an embodiment, the method may further include: during the heavy-load mode, determining when to turn on the switch according to the amount of error between the reference voltage and the output voltage, and turning off the switch when a predetermined interval has elapsed after turning on the switch.

In an embodiment, the method may further include (e.g., 308 in FIG. 3): determining whether to enter a light-load mode (e.g., 310 in FIGS. 3 and 4) from the intermediate mode according to whether the inductor current reaches a bottom current threshold (e.g., I_z in FIG. 4).

In an embodiment, the method may further include (e.g., 304 in FIG. 3): determining whether to enter the intermediate mode from the light-load mode according to whether an off-time for the switch to remain off is shorter than an off-time threshold.

In an embodiment, the method may further include: during the light-load mode, turning on the switch when the output voltage is lower than the reference voltage, and turning off the switch when the inductor current reaches the peak current threshold.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
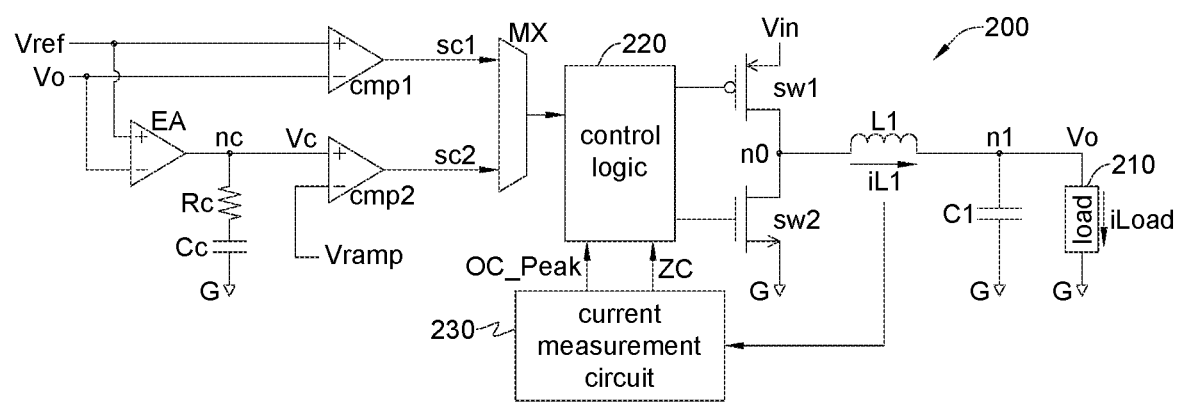
FIG. 2 illustrates a power converter according to an embodiment of the invention.
Figure 3:
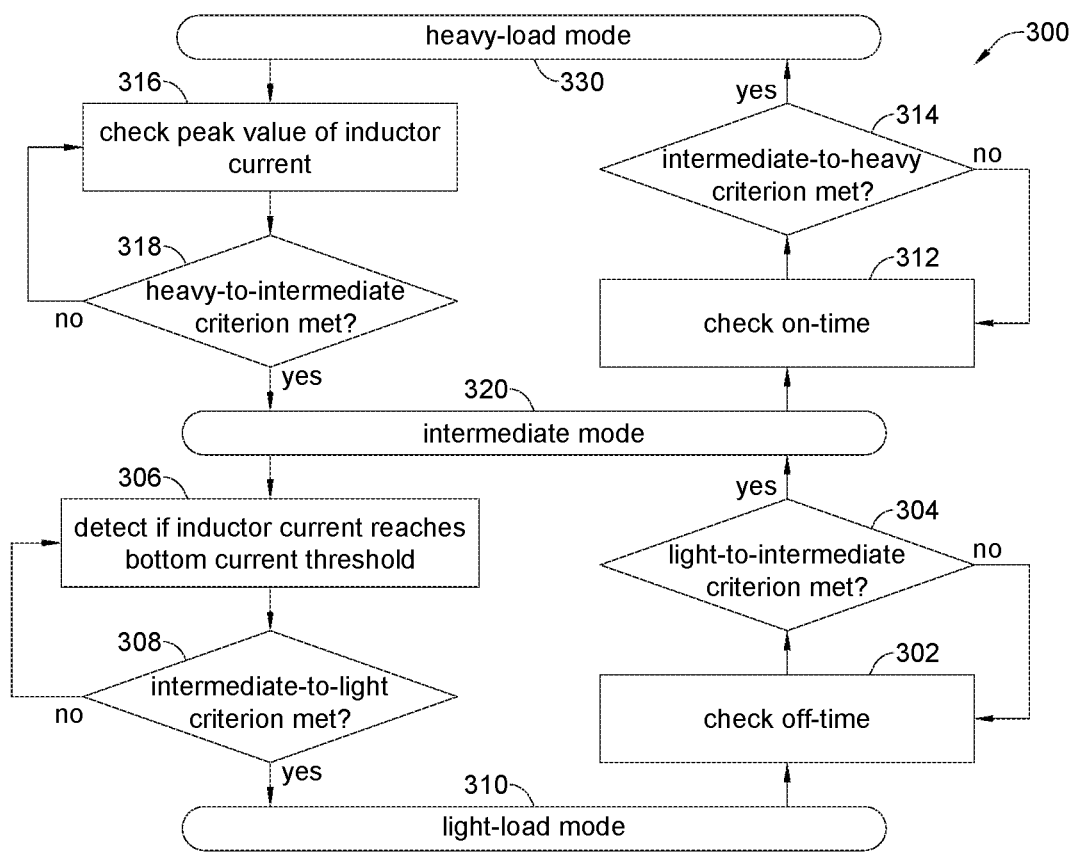
FIG. 3 illustrates a power converter control flow according to an embodiment of the invention.
Figure 4:
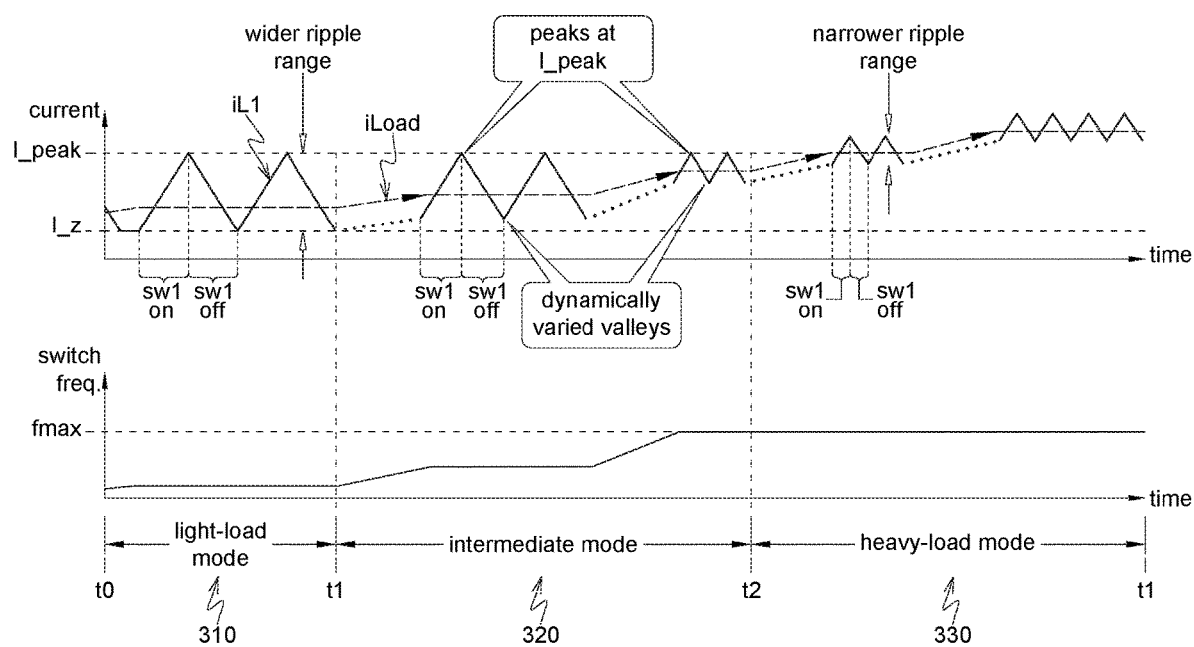
FIG. 4 illustrates an operation example of the power converter shown in FIG. 2.

Please refer to FIGS. 2, 3 and 4. FIG. 2 illustrates a power converter 200 according to an embodiment of the invention; for example, the power converter 200 may be a DC-DC buck converter. FIG. 3 illustrates a control flow 300 according to an embodiment of the invention; the control flow 300 may be applied to the power converter 200. FIG. 4 illustrates an operation example of the power converter 200.

As shown in FIG. 2, the power converter 200 may include two transistors as two switches sw1 and sw2, to cooperate with an inductor L1 and a capacitor C1 for supplying power to a load 210 at a node n1. The switch sw1 may be coupled between a power source Vin and a middle node n0, and the switch sw2 may be coupled between the node n0 and a ground voltage G. The inductor L1 may be coupled between the nodes n0 and n1, and the capacitor C1 may be coupled between the node n1 and the ground voltage G.

When the switch sw1 is turned on, the switch sw1 may conduct the power source Vin to the node n0; when the switch sw1 is turned off, the switch sw1 may stop conducting the power source Vin to the node n0. When the switch sw2 is turned on, the switch sw2 may conduct the node n0 to the ground voltage G; when the switch sw2 is turned off, the switch sw2 may stop conducting the node n0 to the ground voltage G. Via the switches sw1 and sw2, the power converter 200 may supply an inductor current iL1 at the node n0 to result in an output voltage Vo and a load current iLoad at the node n1.

The power converter 200 may further include a control logic 220, a current measurement circuit 230, a multiplexer MX, two comparators cmp1 and cmp2, an error amplifier EA, a capacitor Cc and a resistor Rc. The comparator cmp1 may have two input terminals (marked by "+" and "−") respectively coupled to a reference voltage Vref and the output voltage Vo; the comparator cmp1 may compare the voltages Vref and Vo, and output a binary comparison result signal sc1 to the multiplexer MX to reflect if the reference voltage Vref is higher than the output voltage Vo. The capacitor Cc and the resistor Rc may be serially coupled between an internal node nc and the ground voltage G. The error amplifier EA may have two input terminals (marked by "+" and "−") respectively coupled to the reference voltage Vref and the output voltage Vo. The error amplifier EA may amplify an error between the voltages Vref and Vo, and output an analog signal Vc at the node nc to reflect an amount of the error between the voltages Vref and Vo. The comparator cmp2 may have two input terminals (marked by "+" and "−") respectively coupled to the signal Vc and a signal Vramp; the comparator cmp2 may compare the signals Vc and Vramp, and output a binary comparison result signal sc2 to the multiplexer MX to reflect if the signal Vc is higher than the signal Vramp. In an embodiment, the reference voltage Vref may be a voltage of a constant value, and the signal Vramp may be a compensated ramp signal which may be formed by summing a periodic ramp signal (not shown) and a slope compensation signal (not shown).

In FIG. 2, the current measurement circuit 230 may sense the inductor current iL1 and accordingly output two signals ZC and OC_Peak to the control logic 220. The current measurement circuit 230 may detect if the inductor current iL1 reaches (falls to) a bottom current threshold I_z and accordingly generate the signal ZC. The current measurement circuit 230 may also sense if the inductor current iL1 reaches (rises to) a peak current threshold I_peak and accordingly generate the signal OC_Peak. In an embodiment, the bottom current threshold I_z may be a value less (lower) than the peak current threshold I_peak. In an embodiment, the peak current threshold I_peak may be invariant to the load current iLoad and the output voltage Vo; i.e., value of the peak current threshold I_peak may remain the same when the load current iLoad or the output voltage Vo varies. For example, the peak current threshold I_peak may be a constant value. Similarly, in an embodiment, the bottom current threshold I_z may also be invariant to the load current iLoad and the output voltage Vo; for example, the bottom current threshold I_z may be a constant value less than the peak current threshold I_peak; in an embodiment, the bottom current threshold may be a (constant) value close to zero or equal to zero. In an embodiment, while the peak current threshold I_peak and/or the bottom current threshold I_z may be invariant to the load current iLoad and the output voltage Vo, the peak current threshold I_peak and/or the bottom current threshold I_z may be customizable, programmable, configurable, reconfigurable and/or resettable; for example, the peak current threshold I_peak and/or the bottom current threshold I_z may be reconfigured to adapt different application scenarios, operation environments, and/or implementation considerations, etc.

According to the signals sc1, sc2, ZC and OC_Peak, the control logic 220 coupled to the switches sw1 and sw2 may control on and off of the switches sw1 and sw2. When the switch sw1 is turned on, the power source Vin may cause the inductor current iL1 to rise; when the switch sw1 is off, the inductor current iL1 may stop rising and/or fall. As the control logic 220 cycles the switch sw1 between on and off, the control logic 220 may control the inductor current iL1 to ripple (swing) from valleys to peaks.

By turning on and off the switches sw1 and sw2 in different schemes, the control logic 220 may control the power converter 200 to operate in (at least) three modes: a light-load mode 310, an intermediate mode 320 and a heavy-load mode 330, as shown in FIG. 3. In addition, the control logic 220 may determine whether to exit one mode and enter another mode. As shown in FIG. 3, after exiting the light-load mode 310, the control logic 220 may control the power converter 200 to enter the intermediate mode 320 before entering the heavy-load mode 330. On the other hand, after exiting the heavy-load mode 330, the control logic 220 may control the power converter 200 to enter the intermediate mode 320 before entering the light-load mode 310.

During the light-load mode 310, the control logic 220 may control the inductor current iL1 to ripple with peaks (e.g., local maxima) and valleys (e.g., local minima) respectively at the peak current threshold I_peak and the bottom current threshold I_z, as shown in FIG. 4. That is, during the light-load mode 310, the control logic 220 may control the inductor current iL1 to ripple 13T between the peak current threshold I_peak and the bottom current threshold I_z. In an embodiment, to control the inductor current iL1 to ripple between the peak current threshold I_peak and the bottom current threshold I_z during the light-load mode 310, the control logic 220 may turn on the switch sw1 when the signal sc1 reflects that the output voltage Vo is lower than the reference voltage Vref, and may turn off the switch sw1 when the signal OC_Peak reflects that the inductor current iL1 reaches the peak current threshold I_peak.

During the light-load mode 310, while peaks and valleys of the inductor current iL1 may be respectively maintained at the peak current threshold I_peak and the bottom current threshold I_z without varying with the load current iLoad demanded by the load 210, an off-time for the switch sw1 to remain off may vary as the load current iLoad varies; for example, the off-time may be shorter if the load current iLoad becomes higher. On the other hand, during the light-load mode 310, an on-time for the switch sw1 to remain on may be invariant to the load current iLoad, since the on-time is a duration for charging the inductor current iL1 from the bottom current threshold I_z to the peak current threshold I_peak.

As shown in FIG. 3, during the light-load mode 310, the control logic 220 may further execute steps 302 and 304 to determine whether to exit the light-load mode 310 and enter the intermediate mode 320. In step 302, the control logic 220 may check the off-time of the switch sw1. In step 304, the control logic 220 may check if a light-to-intermediate criterion is satisfied, wherein the light-to-intermediate criterion may be based on the off-time of the switch sw1. When the light-to-intermediate criterion is met, the control logic 220 may control the power converter 200 to enter the intermediate mode 320 from the light-load mode 310, otherwise the control logic 220 may maintain in the light-load mode 310 and iterate back to step 302. In an embodiment, the control logic 220 may determine whether the light-to-intermediate criterion is satisfied (and therefore whether to exit the light-load mode 310) according to whether the off-time of the switch sw1 is shorter than an off-time threshold (not shown). For example, the control logic 220 may determine to enter the intermediate mode 320 when the off-time of the switch sw1 has been shorter than the off-time threshold for a predetermined number (one or more) of consecutive on-off cycles of the switch sw1, with each on-off cycle being a duration when the switch sw1 is turned on and off once. As depicted by the example in FIG. 4, the power converter 200 may operate in the light-load mode 310 from time points t0 to t1; at the time point t1, the light-to-intermediate criterion is satisfied (e.g., the off-time of the switch sw1 is shorter than the off-time threshold), so the control logic 220 may control the power converter 200 to transit to the intermediate mode 320 from the light-load mode 310 at the time point t1.

During the intermediate mode 320, the control logic 220 may control the inductor current iL1 to ripple with peaks at the peak current threshold I_peak and valleys which may vary as the load current iLoad varies. In an embodiment, to control the inductor current iL1 to ripple with constant peaks 1. (at the peak current threshold I_peak) and variable valleys during the intermediate mode 320, the control logic 220 may turn off the switch sw1 when the signal OC_Peak reflects that the inductor current iL1 reaches the peak current threshold I_peak; and, after turning off the switch sw1, the control logic 220 may determine when to stop turning off the switch sw1 (e.g., determine when to turn on the switch sw1 again) according to the signal Vc which reflects the amount of error between the reference voltage Vref and the output voltage Vo. For example, as the signal Vc increases, the control logic 220 may turn off the switch sw1 with shorter off-time, so the valleys of the inductor current iL1 may be higher as the load current iLoad increases. On the other hand, the peaks of the inductor current iL1 may stay at the peak current threshold I_peak, without varying with the load current iLoad. In other words, during the intermediate mode 320, the control logic 220 may control a ripple range (difference between consecutive peak and valley) of the inductor current iL1 to vary as the load current iLoad varies; for example, the ripple range of the inductor current iL1 may become narrower as the load current iLoad increases. Equivalently, during the intermediate mode 320, the control logic 220 may cause the on-time, off-time, on-off cycle (sum of consecutive on-time and off-time) and on-off switch frequency (reciprocal of the on-off cycle) of the switch sw1 to vary as the load current iLoad varies; for example, as the load iLoad increases, the on-time, off-time and on-off cycle of the switch sw1 may be shorter, while the on-off switch frequency of the switch sw1 may be higher, as shown in FIG. 4.

As shown in FIG. 3, during the intermediate mode 320, the control logic 220 may also execute steps 306 and 308 to determine whether to exit the intermediate mode 320 and enter the light-load mode 310, and may further execute steps 312 and 314 to determine whether to exit the intermediate mode 320 and enter the heavy-load mode 330.

In step 306, the current measurement circuit 230 (FIG. 2) may detect if the inductor current iL1 falls down to reach (and cross) the bottom current threshold I_z, and reflect the detection result to the control logic 220 by the signal ZC. In step 308, the control logic 220 may check if an intermediate-to-light criterion is satisfied, wherein the intermediate-to-light criterion may be based on the signal ZC. When the intermediate-to-light criterion is met, the control logic 220 may control the power converter 200 to enter the light-load mode 310 from the intermediate mode 320, otherwise the control logic 220 may stay in the intermediate mode 320 and iterate back to step 306. In an embodiment, the control logic 220 may determine whether the intermediate-to-light criterion is satisfied (and therefore whether to exit the intermediate mode 320 and enter the light-load mode 310) according to whether the inductor current iL1 reaches the bottom current threshold I_z. For example, the control logic 220 may determine to enter the light-load mode 310 when the inductor current iL1 has reached the bottom current threshold I_z for a predetermined number (one or more) of consecutive on-off cycles of the switch sw1.

On the other hand, in step 312, the control logic 220 may check on-time of the switch sw1. In step 314, the control logic 220 may check if an intermediate-to-heavy criterion is satisfied, wherein the intermediate-to-heavy criterion may be based on the on-time of the switch sw1. When the intermediate-to-heavy criterion is met, the control logic 220 may control the power converter 200 to enter the heavy-load mode 330 from the intermediate mode 320, otherwise the control logic 220 may stay in the intermediate mode 320 and iterate back to step 312. In an embodiment, the control logic 220 may determine whether the intermediate-to-heavy criterion is satisfied (and therefore whether to exit the intermediate mode 320 and enter the heavy-load mode 330) according to whether the on-time of the switch sw1 is shorter than an on-time threshold (not shown). For example, the control logic 220 may determine to enter the heavy-load mode 330 when the on-time of the switch sw1 is shorter than the on-time threshold. As depicted by the example in FIG. 4, the power converter 200 may operate in the intermediate mode 320 from time points t1 to t2; at the time point t2, the intermediate-to-heavy criterion is satisfied (e.g., the on-time of the switch sw1 is shorter than the on-time threshold), so the control logic 220 may control the power converter 200 to transit to the heavy-load mode 330 from the intermediate mode 320 at the time point t2. As the on-time of the switch sw1 during the heavy-load mode 330 may be shorter than the on-time during the intermediate mode 320, the switch frequency for the switch sw1 to cycle between on and off during the heavy-load mode 330 may be higher than the switch frequency during the intermediate mode 320.

During the heavy-load mode 330, the control logic 220 may control the inductor current iL1 to ripple in a narrower range comparing to a range in which the inductor current iL1 ripples during the light-load mode 310. In other word, under control of the control logic 220, the ripple range of the inductor current iL1 in the heavy-load mode 330 may be narrower than the ripple range in the light-load mode 310. To control the inductor current iL1 to ripple in the narrower range during the heavy-load mode 330, the control logic 220 may determine when to turn on the switch sw1 according to the amount of error between the reference voltage Vref and the output voltage Vo (e.g., according to the signal Vc of the error amplifier), and may turn off the switch sw1 when a predetermined interval (e.g., a constant value, not shown) has elapsed after turning on the switch sw1. For example, when the error between the voltages Vref and Vo increases as the load current iLoad increases, the control logic 220 may turn off the switch sw1 with a shorter off-time, so peaks and valleys of the inductor current iL1 may be higher to track the increasing load current iLoad, as shown in FIG. 4. In other words, while the control logic 220 may control the inductor current iL1 to ripple with peaks at the peak current threshold I_peak during the light-load mode 310 and the intermediate mode 320, the control logic 220 may no longer constrain rippling of the inductor current iL1 to be bounded under the peak current threshold I_peak. In associated with the narrower and wider ripple range of the inductor current iL1 respectively during the heavy-load mode 330 and the light-load mode 310, the on-time, off-time and on-off cycle of the switch sw1 in the heavy-load mode 330 may be shorter than those in the light-load mode 310, and the on-off switch frequency of the switch sw1 in the heavy-load mode 330 may be higher than that in the light-load mode 310. For example, during the heavy-load mode 330, the switch frequency of the switch sw1 may be as high as a frequency fmax, as shown in FIG. 4.

During the heavy-load mode 330, the control logic 220 may also execute steps 316 and 318 (FIG. 3) to determine whether to exit the heavy-load mode 330 and enter the intermediate mode 320. In step 316, the current measurement circuit 230 (FIG. 2) may sense peak value of the inductor current iL1. In step 318, the control logic 220 may determine if a heavy-to-intermediate criterion is satisfied, wherein the intermediate criterion may be based on the peak value of the inductor current iL1. When the heavy-to-intermediate criterion is met, the control logic 220 may control the power converter 200 to enter the intermediate mode 320 from the heavy-load mode 330, otherwise the control logic 220 may stay in the heavy-load mode 330 and iterate back to step 316. In an embodiment, the control logic 220 may determine whether the heavy-to-intermediate criterion is satisfied (and therefore whether to exit the heavy-load mode 330 and enter the intermediate mode 320) according to whether the peak(s) of the inductor current iL1 is/are lower than a mode-switching current threshold (not shown), which may be set equal to the peak current threshold I_peak. For example, the control logic 220 may determine to enter the intermediate mode 320 from the heavy-load mode 330 when peaks of the inductor current iL1 remain lower than the mode-switching current threshold for a predetermined number (one or more, e.g., 8) of consecutive on-off cycles of the switch sw1.

Figure 1A:
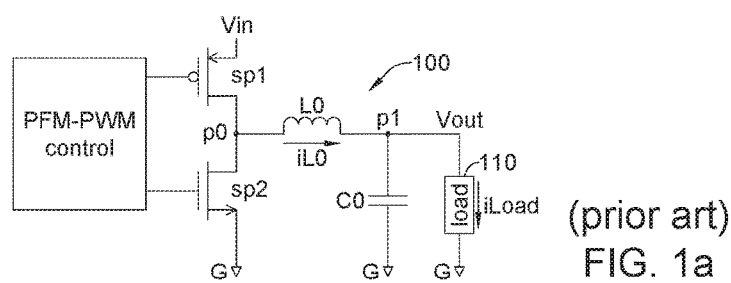
FIG. 1a (prior art) illustrates a conventional power converter.
Figure 1B:
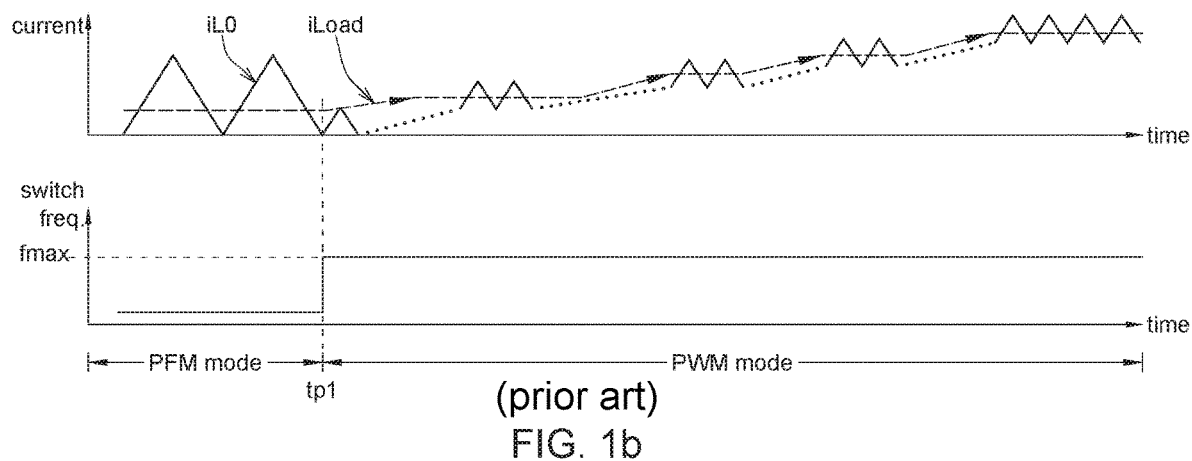
FIG. 1b (prior art) illustrates operation of the conventional power converter.
Figure 1C:
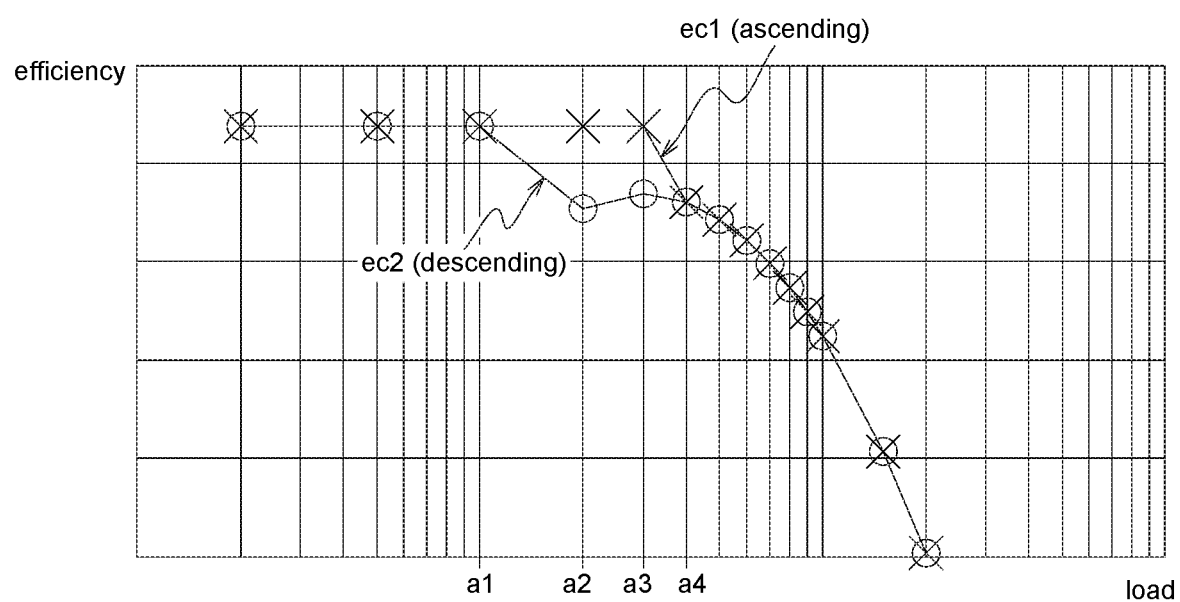
FIG. 1c (prior art) illustrates power conversion efficiency of the conventional power converter.
Figure 5:
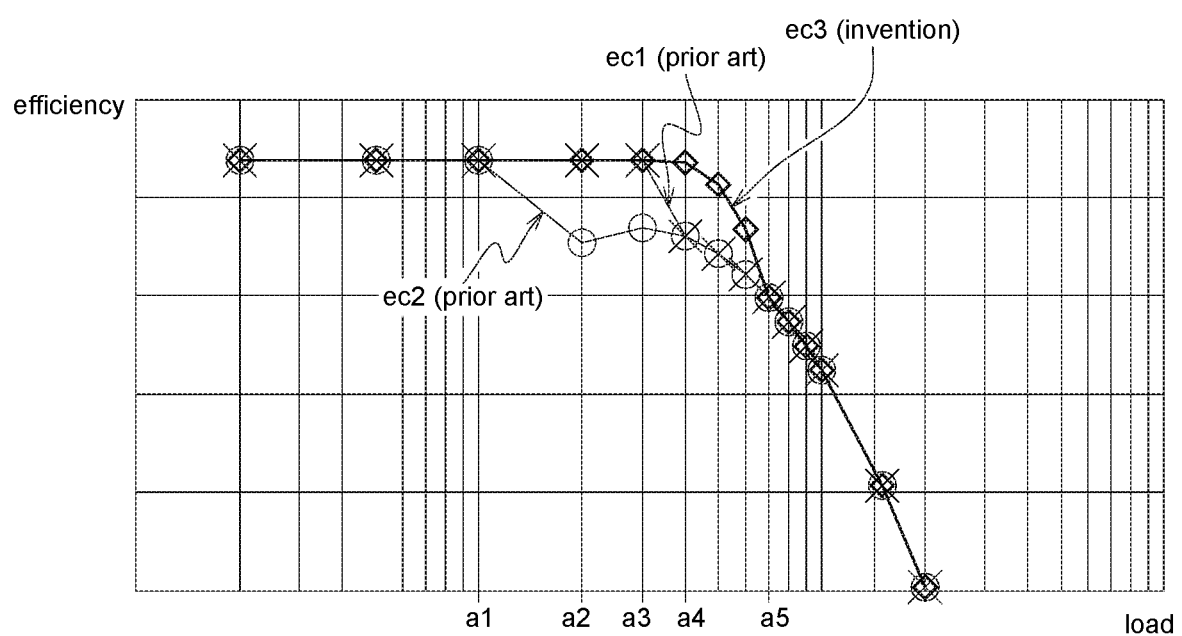
FIG. 5 illustrates power conversion efficiency achieved by applying the control flow shown in FIG. 3 to the power converter shown in FIG. 2.

As depicted by the example in FIG. 4, because the invention additionally interposes the intermediate mode 320 between the light-load mode 310 and the heavy-load mode 330, the wide ripple range (of the inductor current iL1) in the light-load mode 310 may smoothly transit to the narrow ripple range in the heavy-load mode 330 by the gradually decreased ripple range during the intermediate mode 320. Similarly, the low on-off switch frequency (of the switch sw1) in the light-load mode 310 may smoothly transit to the high on-off switch frequency in the heavy-load mode 330 by the gradually increased on-off switch frequency during the intermediate mode 320. Though not shown in FIG. 4, the intermediate mode 320 will also smooth the transition from the heavy-load mode 330 to the light-load mode 310. The smooth transition between modes may help to improve power conversion efficiency of the power converter 200. Please refer to FIG. 5 illustrating power conversion efficiency according to an embodiment of the invention. When the demanded load (load current) ascends from low to high and descends from high to low, power conversion efficiency achieved by applying the control flow 300 (FIG. 3) to the power converter 200 (FIG. 2) may be shown by a diamond-marked curve ec3. For comparison between the invention and prior art, the cross-marked curves ec1 and circle-marked ec2, which are originally shown in FIG. 1c to depict power conversion efficiency of the conventional power converter 100 (FIG. 1a), are also shown in FIG. 5.

As shown in FIG. 5, it is first noted that, unlike the conventional power converter 100 which suffers from diverged efficiency curves ec1 and ec2 when the load respectively ascends and descends between load values a1 and a4, the power conversion according to the invention may achieve same efficiency when the load ascends and descends, as shown by the curve ec3, because the intermediate mode 320 is adopted between the light-load mode 310 and the heavy-load mode 330. It is also noted that, while the curve ec1 of prior art suffers from sudden downward ramp at load value a3, the curve ec3 according to the invention may vary much more smoothly between load values a3 and a5, and remain higher than the curves ec1 and ec2 between the load values a3 and a5. In other word, comparing to the conventional power converter 100, the power converter 200 operating under the control flow 300 according to the invention may not only gain higher power conversion efficiency when the load increases from the load values a3 to a5 (as the curve ec3 is higher than the curve ec1 between the load values a3 and a5), but also gain higher power conversion efficiency when the load decreases from load values a5 to a1 (as the curve ec3 is higher than the curve ec2 between the load values a1 and a5).

To sum up, by interposing the intermediate mode during which the inductor current may be controlled to ripple with constant peaks and variable valleys, the power conversion according to the invention may effectively improve power conversion efficiency over a wide range of load values.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for improving efficiency of a power converter which comprises a switch coupled between a power source and a middle node, and supplies an inductor current at the middle node to result in an output voltage and a load current; the method comprising:
   during an intermediate mode, controlling the inductor current to ripple with peaks at a peak current threshold and valleys which vary as the load current varies;
   entering the intermediate mode from a light-load mode; and
   entering a heavy-load mode from the intermediate mode when an on-time for the switch to remain on is shorter than a predetermined on-time threshold.

2. The method of claim 1 further comprising:
   entering the intermediate mode from the heavy-load mode; and
   entering the light-load mode from the intermediate mode.

3. The method of claim 2 further comprising:
   determining whether to enter the intermediate mode from the heavy-load mode according to whether a peak of the inductor current is lower than a mode-switching current threshold.

4. The method of claim 3, wherein the mode-switching current threshold equals the peak current threshold.

5. The method of claim 2, wherein:
   a switch frequency for the switch to cycle between on and off during the heavy-load mode is higher than the switch frequency during the intermediate mode.

6. The method of claim 1, wherein controlling the inductor current to ripple with peaks at the peak current threshold and valleys which vary as the load current varies during the intermediate mode comprises:
   turning off the switch when the inductor current reaches the peak current threshold; and after turning off the switch, determining when to stop turning off the switch according to an amount of an error between a reference voltage and the output voltage.

7. The method of claim 2 further comprising:
determining whether to enter the light-load mode from the intermediate mode according to whether the inductor current reaches a bottom current threshold.

8. The method of claim 7, wherein the bottom current threshold is a constant value.

9. The method of claim 2 further comprising:
determining whether to enter the intermediate mode from the light-load mode according to whether an off-time for the switch to remain off is shorter than an off-time threshold.

10. The method of claim 1, wherein the peak current threshold is a constant value.

11. A method for improving efficiency of a power converter; the power converter supplying an inductor current at a middle node to result in an output voltage and a load current, and the power converter comprising a switch coupled between a power source and the middle node; the method comprising:
during an intermediate mode, turning on the switch to conduct the power source to the middle node, and turning off the switch to stop conducting the power source to the middle node when the inductor current reaches a peak current threshold; and
during the intermediate mode, after turning off the switch, determining when to stop turning off the switch according to an amount of an error between a reference voltage and the output voltage; and
entering a heavy-load mode from the intermediate mode when an on-time for the switch to remain on is shorter than a predetermined on-time threshold.

12. The method of claim 11 further comprising:
determining whether to enter the intermediate mode from the heavy-load mode according to whether a peak of the inductor current is lower than a mode-switching current threshold.

13. The method of claim 12, wherein the mode-switching current threshold equals the peak current threshold.

14. The method of claim 11 further comprising:
during the heavy-load mode, determining when to turn on the switch according to the amount of the error between the reference voltage and the output voltage, and turning off the switch when a predetermined interval has elapsed after turning on the switch.

15. The method of claim 11 further comprising:
determining whether to enter a light-load mode from the intermediate mode according to whether the inductor current reaches a bottom current threshold.

16. The method of claim 15 further comprising:
determining whether to enter the intermediate mode from the light-load mode according to whether an off-time for the switch to remain off is shorter than an off-time threshold.

17. The method of claim 15 further comprising:
during the light-load mode, turning on the switch when the output voltage is lower than the reference voltage, and turning off the switch when the inductor current reaches the peak current threshold.

18. The method of claim 15 further comprising:
during the light-load mode, controlling the inductor current to ripple with peaks at the peak current threshold and valleys at the bottom current threshold.

19. The method of claim 11, wherein the peak current threshold is a constant value.

* * * * *